June 14, 1966     A. M. MOEN     3,255,483

VALVE HANDLE CONSTRUCTION

Original Filed Feb. 3, 1960     2 Sheets-Sheet 1

INVENTOR.
Alfred M. Moen,
BY Parker & Carter
Attorneys.

June 14, 1966   A. M. MOEN   3,255,483
VALVE HANDLE CONSTRUCTION
Original Filed Feb. 3, 1960   2 Sheets-Sheet 2
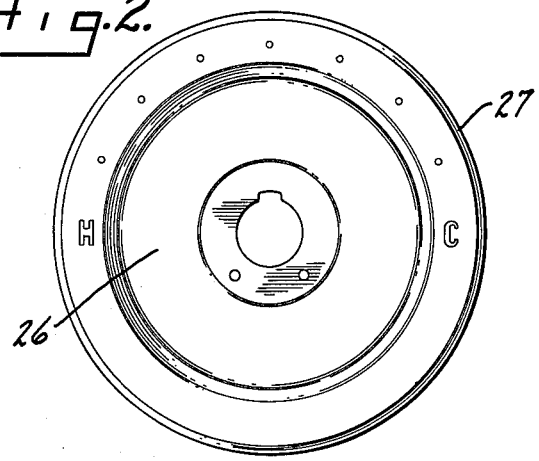
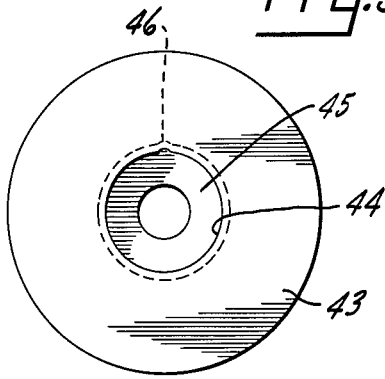
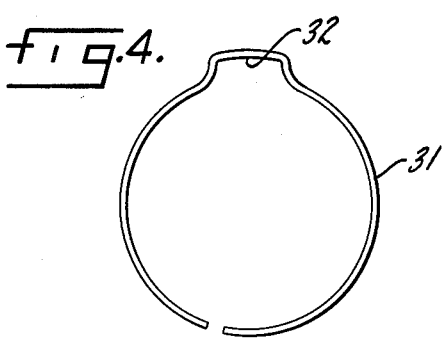
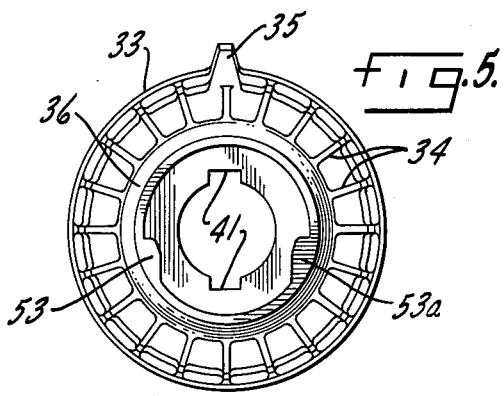
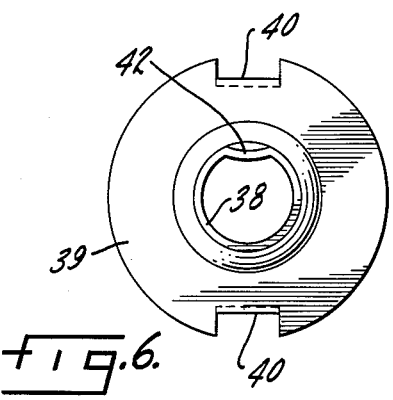
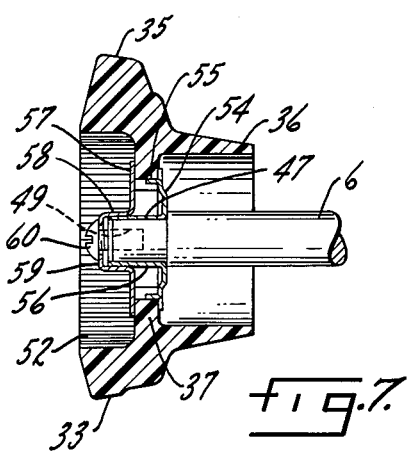
INVENTOR.
Alfred M. Moen,
BY Parker & Carter
Attorneys.

3,255,483
VALVE HANDLE CONSTRUCTION
Alfred M. Moen, 25 Lakeview Drive, Grafton, Ohio
Original application Feb. 3, 1960, Ser. No. 6,468, now Patent No. 3,167,855, dated Feb. 2, 1965. Divided and this application Nov. 4, 1964, Ser. No. 408,819
5 Claims. (Cl. 16—121)

This is a division of my copending application Serial No. 6,468, filed February 3, 1960, now Patent 3,167,855 issued February 2, 1965.

The invention relates to a faucet and a faucet handle. It has for one object to provide a handle mechanism for controlling the shaft or stem of a faucet.

Other objects will appear from time to time throughout the specification and claims.

The invention is illustrated more or less diagrammatically in the accompanying drawings wherein:

FIGURE 2 is a reduced scale elevation of the escutcheon;

FIGURE 3 is a plan view of the handle cup;

FIGURE 4 is an end view of the stop tube;

FIGURE 5 is an inside view of the handle for adjustment of the faucet;

FIGURE 6 is a view illustrating the handle flange; and

FIGURE 7 is a section through the handle assembly with parts in elevation.

Like parts are designated by like numerals throughout the specification and drawings.

Figure 1:
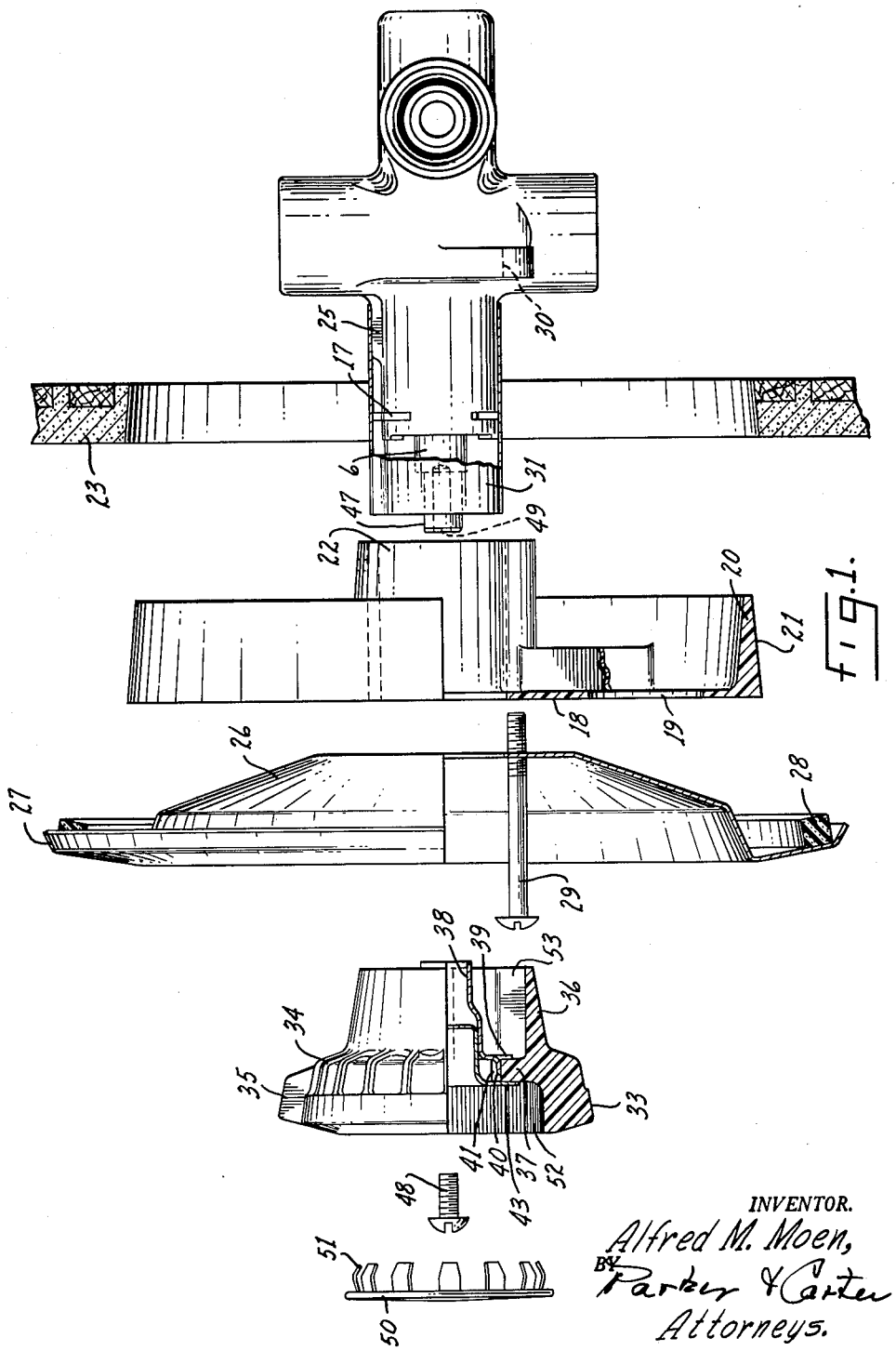
FIGURE 1 is an exploded view with parts in section and parts in elevation illustrating the faucet housing, the plaster ground, the escutcheon and the handle members in line and separated from each other.

In the particular form here shown the device includes a housing member which is provided with water inlet connections for hot and cold water and they lead to a central chamber. The space within the chamber and the member receives a valve part or parts or a valve assembly. None is shown in full since this invention is not limited to a particular valve assembly. Generally the valve assembly will include an operating stem. One form of such a stem is shown at 6 in FIGURE 1.

In the exploded view of FIGURE 1 the housing parts, the escutcheon and the handle parts are shown in proper relative position. Interposed between the escutcheon and the wall and the valve assembly and housing is a so-called "plaster ground."

The plaster ground in the particular form shown comprises a generally flat meber 18 which is provided with one or more perforations 19 through it. It has a peripheral flange 20 which is beveled as at 21 on its exterior. It has also a central tubular extension 22 which extends farther away from the member 18 than does the flange 21, as shown particularly in FIGURE 1. The length of the tubular extension 22 is equal to the length of the valve stem housing. When the plaster ground is assembled the inner end of the tubular portion 22 abuts against the valve housing and the outer surface of the flat portion 18 coincides with the outer surface of the wall 23. A keyway 24 may be provided in the tubular portion and a mating projection 25 may be formed on the housing thus the plaster ground is positioned accurately in relation to the housing as a whole.

An escutcheon member is provided with a hollow or conical portion 26 which extends into the space left in the wall after the completion of plastering. The escutcheon also includes a lateral flange 27 and may carry a packing member 28 of rubber or similar material. The size of the extension 27 is such that it overlies the wall and the packing or sealing member 28 is compressed against the wall when the escutcheon is screwed into place by means of the screws 29 which engage threaded openings 30 in suitable extensions of the housing member.

The valve means, of which only the stem 6 is shown, may be inserted in the housing before the escutcheon is put in place or afterwards. Whenever it is inserted the key 17 is inserted in a keyway and holds the valve assembly in place within its housing. Thereafter the stop tube 31 is put in place. It is provided with a keyway 32 into which the portion 17 of the key fits and thus the key 17 is held from displacement. The handle may now be applied.

The handle in the form shown in FIGURE 1 comprises a gripping member 33 which has an integral knurled or roughened portion 34 and a pointer 35. It is provided also with an integral tubular or hollow extension 36 and an integral flange-forming member 37. As a means of securing the handle to the valve stem 6 there is provided a handle flange gripping member which includes a tubular portion 38 of two diameters and an integral flange 39 which may contact the flange 37 of the handle as shown in FIGURE 1. A plurality of locating tongues 40 is formed in or punched out of the flange 39 and they fit into depressions 41 formed in the flange 37 of the handle. The tubular portion 38 is provided with a flattened or partially arcuate member 42.

Cooperating with the handle flange is a handle cup shown in FIGURE 3. It includes a flangelike portion 43 and a central tubular portion 44 which terminates in an inwardly directed flange 45. The tubular portion 44 may have a bead 46 to make a tight fit when the handle cup is pressed into place in the handle and against the cup 38. The handle may conveniently be formed of plastic.

When the handle is assembled on the valve stem the flat portion 42 fits over a corresponding flattened portion 47 of the valve stem 6. The handle is secured to the valve stem 6 by a screw 48 which engages a threaded opening 49 in the valve stem 6. A finishing plate 50 is provided with spring fingers 51 and may be snapped or sprung into the open outwardly facing depression 52 of the handle 33.

The handle 33 is preferably provided with stops 53 and 53a which engage the keyway or stop 32 on the sleeve 31 and thus limit rotation of the handle in clockwise and counterclockwise direction.

FIGURE 7 is a section through the assembly with parts in elevation and showing a modified form. In the modification of FIGURE 7, the handle member 33 is the same as that shown in the other figures and described above. The arrangement of the handle parts which engage the valve stem is modified to permit flusher fitting of the handle within the escutcheon so that it does not extend so far out. As shown therefore in FIGURE 7, the valve stem 6 extends directly through the flange 37 of the handle. A mounting flange 54, which is provided with engaging tongues 55 and a central tubular portion 56, is secured to the handle by the tongues 55 and is provided with a flat portion and engages the corresponding flat portion of the valve stem 6 in the same manner as that described above in connection with the form of the handle shown in FIGURE 1. A second flange 57 is provided and engages the opposite face of the flange 37 of the handle. It is integral with a tubular section 58 which surrounds and is in contact with the tubular section 56. The member 58 terminates in an inturned flange 59 within which an opening is left through which a screw 60 may pass. The screw 60 engages the threaded opening 49 in the valve stem 6 and when it is tightened the parts of the handle assembly are drawn together and secured together as shown in FIGURE 10.

Although an operative form of the device has been shown, the invention is not limited to the particular details shown. Many changes may be made in the form, shape and arrangement of parts without departing from the spirit of the invention. In particular, the method of installation might be accomplished with faucet devices of other descriptions and with water supply installations of a variety of types.

The present invention is directed to the handle details of the finishing members such as the escutcheon plate and it is not limited to a particular total faucet nor to any particular method of installing either the faucet assembly or the valve or the wall.

The use and operation of the device shown, and particularly the method of assembly, are as follows:

When the parts are assembled, the handle may be put in place. It comprises the gripping member or handle part 33 which, as shown at FIGURE 1, is knurled at 34 and provided with a pointer 35. The handle and supporting parts are assembled to permit the positioning of the handle as far inside the escutcheon plate as possible. Thus the tubular member 38 projects through the opening in the handle and its stop or stops 39 limit its movement in one direction by their contact with the portion 37. The handle cup 43 as shown in FIGURE 3 and FIGURE 1, is put in place within the tubular member 38 and its movement in one direction is limited by its flange 43. The knob or handle is thus complete as shown in FIGURE 1. A modification of this ararngement is shown in FIGURE 7 in which the end of the stem 6 projects more nearly to the outer surface of the knob or handle 35. The structural details of this supporting means are described above and will not be repeated here.

With the handle complete in the form either of FIGURE 7 or FIGURE 1, the tubular portion 38 is slipped over the exposed end of the stem 6, the part 42, for example, of tubular portion 38 being fitted over and engaging the flattened portion 47 of the stem 6. If desired, there may be two flattened portions of the stem 6 and in that case the tubular member 38 would have two members or portions such as the portion 42. When the handle has been put fully into engagement with the stem, being moved in over the stem as far as the length of the flattened portion 47 permits, the screw 48 is then inserted in the tapped opening 49. It passes through the tubular portion 44 of the cup 43 and the flange of the screw rests upon the portion 45. When the screw has been screwed home, the handle is in complete location. The pointer 35 will generally be aligned with indicia on the escutcheon plate as indicated in FIGURE 2 in which the letter H indicates the direction of the handle movement for hot water and the letter C indicates the direction of handle movement for cold water.

When the handle is fully in place and the screw 48 has been drawn home, the finishing plate 50 is inserted in the outwardly directed cavity of the handle, the spring fingers serving to hold it removably in place.

In the rotation of the valve stem, means are provided to act as a stop to limit the rotation in each direction. These means comprise the shoulders 53 and 53a and the portion 32 of the sleeve. In clockwise rotation, the shoulder 53a contacts the member 32 and limits rotation in that direction. Correspondingly, in counterclockwise rotation, the shoulder 53 contacts the member 32 and limits rotation in that direction. By this construction and manner of operation the valve stem itself is protected from any strain or shock as a result of the stop movement. Since the handle stop mechanism is contained within the handle and the sleeve 31, there is no strain due to the stopping action upon the stem or the screw 60 which fastens the handle to the stem, and there is thus no tendency to loosen the handle on the stem nor to loosen the screw which fastens the handle to the stem.

Whereas the preferred form of the invention has been shown and described herein, it should be realized that there are many modifications, substitutions and alterations thereto, within the scope of the following claims.

What is claimed is:

1. A handle comprising a hollow knob-like member open at both ends, an integral flange positioned within said knob-like member and intermediate its ends and projecting inwardly to provide a central aperture with an out-of-round edge portion, and a plurality of tubular members nested together in contact with each other, and an out-of-round tubular portion for engaging a stem, said tubular members provided with flange engaging parts, said parts being in contact with said flange, one on each side of it, one of said tubular members provided also with flange edge engaging parts, the said tubular members and flange engaging parts being of relatively slight thickness with respect to the thickness of said flange.

2. The structure of claim 1 further characterized by and including a finishing plate having integral members adapted to penetrate into one of said open ends.

3. The structure of claim 2 further characterized in that said tubular members nest together and contact each other in the open end adjacent said finishing plate.

4. The structure of claim 2 further characterized in that said tubular members nest together and contact each other in the open end away from said finishing plate.

5. The structure of claim 1 further characterized in that said handle includes a pointer portion on the outer periphery thereof.

References Cited by the Examiner

UNITED STATES PATENTS

| | | | |
|---|---|---|---|
| 1,053,763 | 2/1913 | Waston | 251—288 |
| 1,354,106 | 9/1920 | Holton | 16—117 |
| 1,373,476 | 4/1921 | Zolleis | 16—117 |
| 1,678,524 | 7/1928 | Nielsen | 287—53 X |
| 1,835,301 | 12/1931 | Hennessey | 4—191 |
| 1,958,165 | 5/1934 | Le Compte | 16—117 X |

M. CARY NELSON, *Primary Examiner.*

H. KLINKSIEK, *Assistant Examiner.*